C. DABELSTEIN.
TIRE GUARD.
APPLICATION FILED OCT. 14, 1911.
1,022,658.
Patented Apr. 9, 1912.
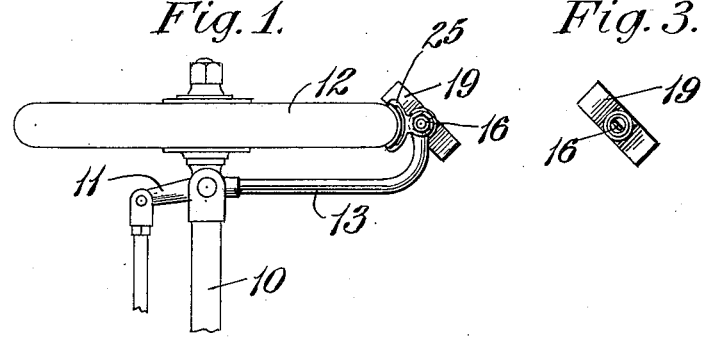
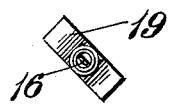
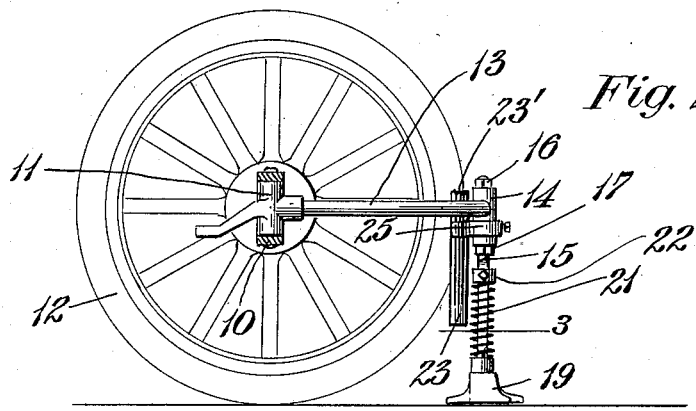
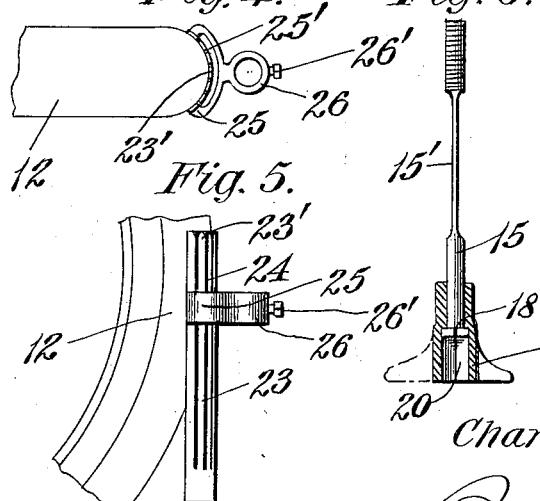
Witnesses
F. E. Ernst
Chas. W. Stauffiger
Inventor
Charles Dabelstein,
By
Attorneys

UNITED STATES PATENT OFFICE.

CHARLES DABELSTEIN, OF DETROIT, MICHIGAN.

TIRE-GUARD.

1,022,658.   Specification of Letters Patent.   Patented Apr. 9, 1912.

Application filed October 14, 1911. Serial No. 654,588.

*To all whom it may concern:*

Be it known that I, CHARLES DABELSTEIN, a citizen of the United States of America, residing at Detroit, in the county of Wayne and State of Michigan, have invented certain new and useful Improvements in Tire-Guards, of which the following is a specification, reference being had therein to the accompanying drawings.

This invention relates to tire guards which may be attached to vehicles in front of the wheels to clear the road of loose obstructions, and it has for one of its objects the provision of a device which is yieldingly supported on the vehicle to accommodate itself to the bounding of the vehicle and also to pass over objects embedded in the road without damaging the device.

This invention has furthermore for its object the provision of such device which is equipped with a guard plate closely adjacent the wheel tire and adapted to scrape off or pull out any object which may have been picked up by the tire, such as pieces of glass, small stones, nails etc.

Further objects of the invention will hereinafter appear and be particularly defined in the claims.

The invention has been clearly illustrated in the accompanying drawings, in which similar characters denote similar parts, and in which—

Figure 1 is a plan view of an automobile front wheel and axle equipped with my device; Fig. 2 is an inner elevation thereof; Fig. 3 shows a section on line 3, of Fig. 2; Fig. 4 is a top view of the device; Fig. 5 is a side view thereof, and Fig. 6 represents the road-clearer, *per se.*

Referring to the drawings, 10 denotes the front or steering-axle of an automobile pivotally supporting the steering-knuckle 11 on which the wheel 12 is journaled, all these parts being of any suitable or well-known construction. In the present instance the knuckle 11 has a forwardly extending arm 13, the outer end of which terminates in a boss 14 in which is secured a rod 15 which constitutes the holder for the road-scraper and is screwthreaded to be engaged by nuts 16, 17 at opposite ends of the boss, whereby said rod may be adjusted and rigidly held in position vertically and axially. The lower end of the rod 15 has a head or shoulder 18 to retain a shoe 19, the latter having a recess 20 which permits vertical movement due to the bounding of the vehicle or to unevenness of the ground. A spring 21 surrounding the rod and interposed between the shoe 19 and an adjustable collar 22 tends to hold the shoe down. The rod 15 is swaged intermediate its ends to form a resilient portion 15' which is positioned angularly relatively to the travel of the wheel (see Fig. 3), so that when the shoe strikes an obstruction in the road, the rod can yield inwardly and consequently resume its normal position. Any removable object in the road will be pushed toward the side of the wheel to avoid the same.

Inasmuch as it frequently occurs that small pieces of glass, nails, and the like become embedded in the tire as the wheel travels over the road, I provide a guard or clearing member 23 semi-tubular in cross-section and corresponding to the contour of the wheel-tire, so that its upper edge 23' may be positioned closely adjacent thereto, and be adapted to engage any foreign objects on the tire. The guard is substantially vertical and has slots 24 the walls of which serve as extractors for nails and the like, as the wheel rotates relatively to the guard and its periphery consequently travels away from the latter. The guard plate has a bracket 25 grooved or spaced from the outer face thereof as at 25' to provide room for the passage of the nail-heads or similar objects, and provided with a hub 26 fitted over the boss 14 above referred to and secured to the same by a set-screw 26'.

From the foregoing it will be understood that the guard and its holder remain in permanent fixed-relation to the wheel regardless of the steering-movement of the latter.

Changes may be made in the construction and organization of the elements of the device without departing from the spirit of the invention.

I claim:—

1. The combination with a wheel and its journal-support, of an arm attached to said support, a guard attached to said arm adjacent the periphery of the wheel and a scraper carried by the outer end of said arm, said scraper having a resilient portion intermediate its ends to permit lateral deflection thereof.

2. The combination with a wheel and its journal-support, of an arm attached thereto, a guard plate on the arm fitting the contour of said wheel, and a laterally yielding and vertically movable scraper carried by the arm.

3. The combination with a wheel and its journal-support, of an arm carried by said support, a wheel guard supported by said arm adjacent the periphery of the wheel, a vertically movable scraper carried by said arm and means for yieldingly holding down the said scraper.

4. A tire guard comprising a holder, a rod vertically adjustable therein, and a shoe mounted for free vertical movement on the lower end of said rod.

In testimony whereof I affix my signature in presence of two witnesses.

CHARLES DABELSTEIN.

Witnesses:
C. R. STICKNEY,
F. E. ERNST.

Copies of this patent may be obtained for five cents each, by addressing the "Commissioner of Patents, Washington, D. C."